United States Patent

Etchison, Jr.

[15] 3,636,438

[45] Jan. 18, 1972

[54] METHOD OF AND APPARATUS FOR MEASURING A TIME VARYING CHARACTERISTIC OF A MAGNETIC CORE

[72] Inventor: John O. Etchison, Jr., Clemmons, N.C.
[73] Assignee: Western Electric Company, Incorporated, New York, N.Y.
[22] Filed: Sept. 22, 1969
[21] Appl. No.: 859,653

[52] U.S. Cl. ............................ 324/34 R, 324/73 R, 198/19, 209/81
[51] Int. Cl. ............................................. G01r 33/12
[58] Field of Search ........................ 324/34, 34 MC, 73, 158; 209/81, 81.1, 111.8

[56] References Cited

UNITED STATES PATENTS

R21,927  10/1941  Brace et al. ........................... 209/81.1
3,039,604  6/1962  Bickel et al. .......................... 324/73 AT

OTHER PUBLICATIONS

Gagnon, F.; Ferrite Core Storage Testing Procedure; IBM, Tech. Discl. Bull., Vol. 8, No. 1; June 1965 pp. 138– 139

Primary Examiner—Gerard R. Strecker
Assistant Examiner—R. J. Corcoran
Attorney—W. M. Kain, R. P. Miller and B. I. Levine

[57] ABSTRACT

A useful permeability characteristic value may be extrapolated for a ferrite core from permeability data obtained at two distinct instants in time, $t_1$ and $t_2$. These instants terminate two different predetermined time periods elapsed from a demagnetizing operation performed upon the core at a time $t_0$. Testing apparatus provides for the performing of demagnetizing, first permeability testing and second permeability testing steps upon a succession of ferrite cores. All permeability tests are performed in a single permeability testing station at appropriate times $t_1$ and $t_2$ for each particular core being tested, i.e., dependent upon the time $t_0$ for the particular core. Each core is transported about a closed loop between the two permeability tests and is returned to the permeability testing station at the time $t_2$. An additional testing station for performing a miscellaneous test upon each core at a time $t_i$ intermediate the times $t_1$ and $t_2$ is located in an appropriate position along the closed loop. A series of linear and rotary conveyors are operated in timed relationship so as to transport each successive core, demagnetized at a time $t_0$, to the permeability testing station at the proper time $t_1$, then along the loop to the intermediate, miscellaneous testing station at the proper time $t_i$, then back to the permeability testing station to complete the loop at the proper time $t_2$ and, finally, to an appropriately located unloading station subsequent to the time $t_2$.

9 Claims, 3 Drawing Figures

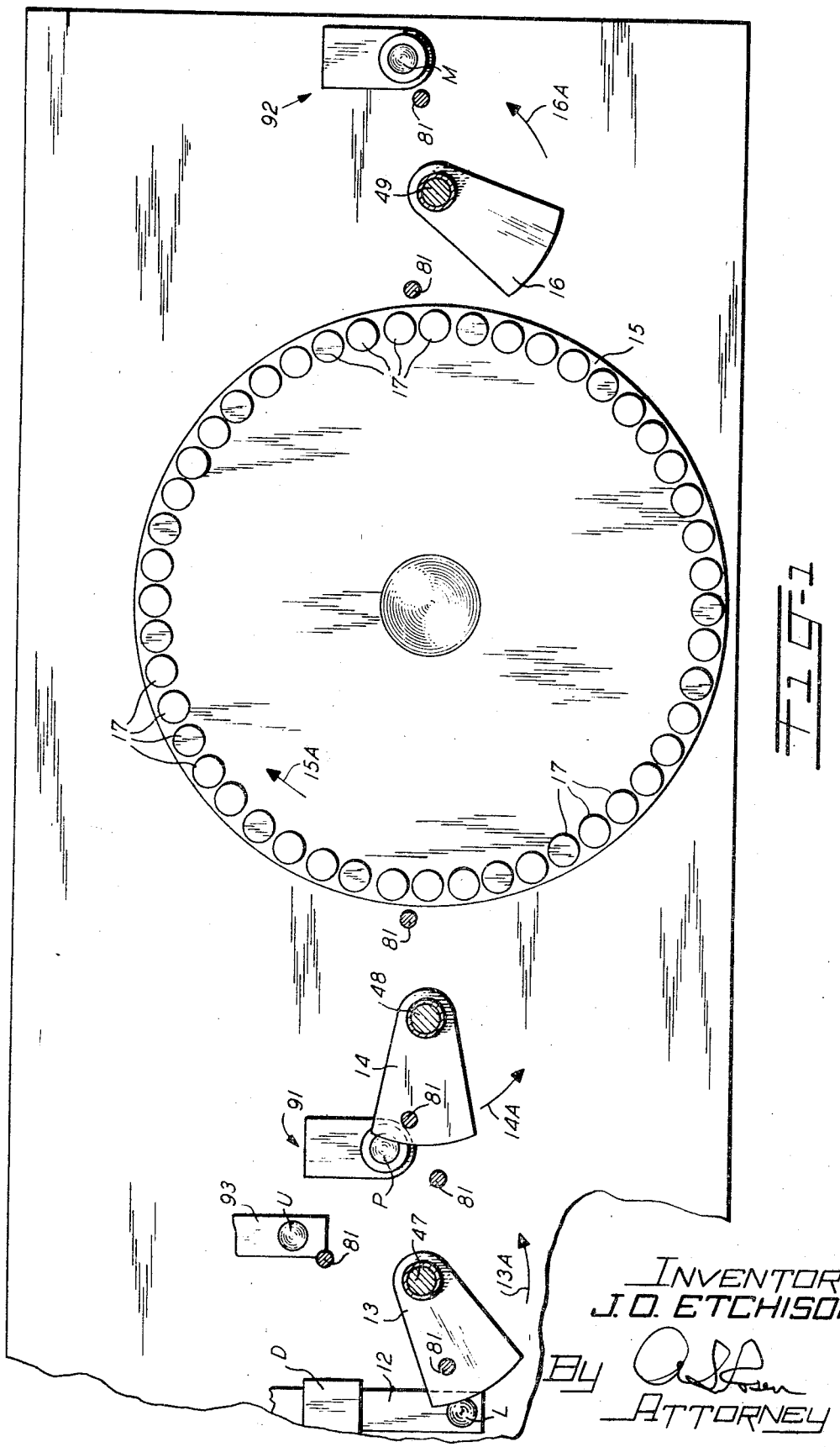

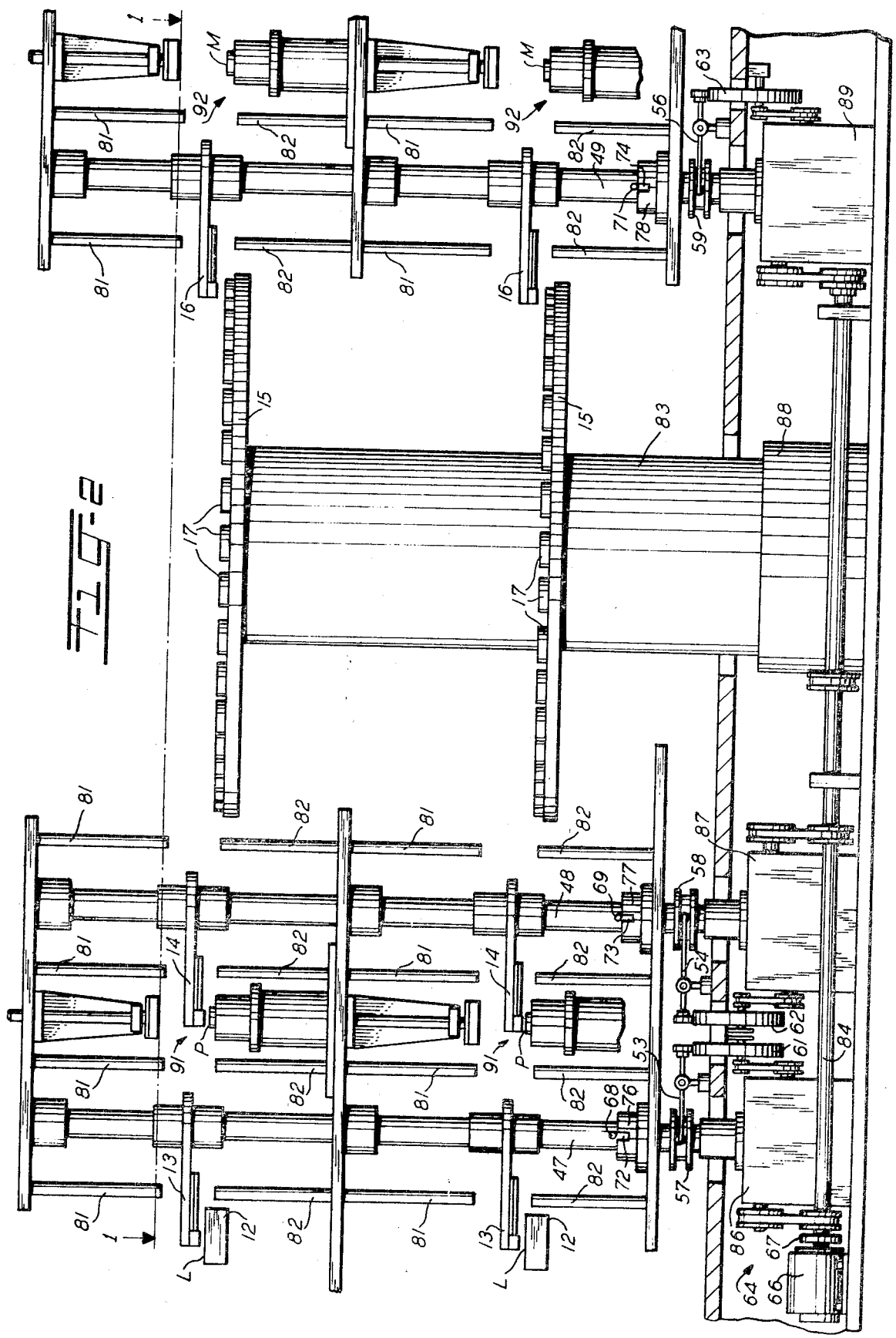

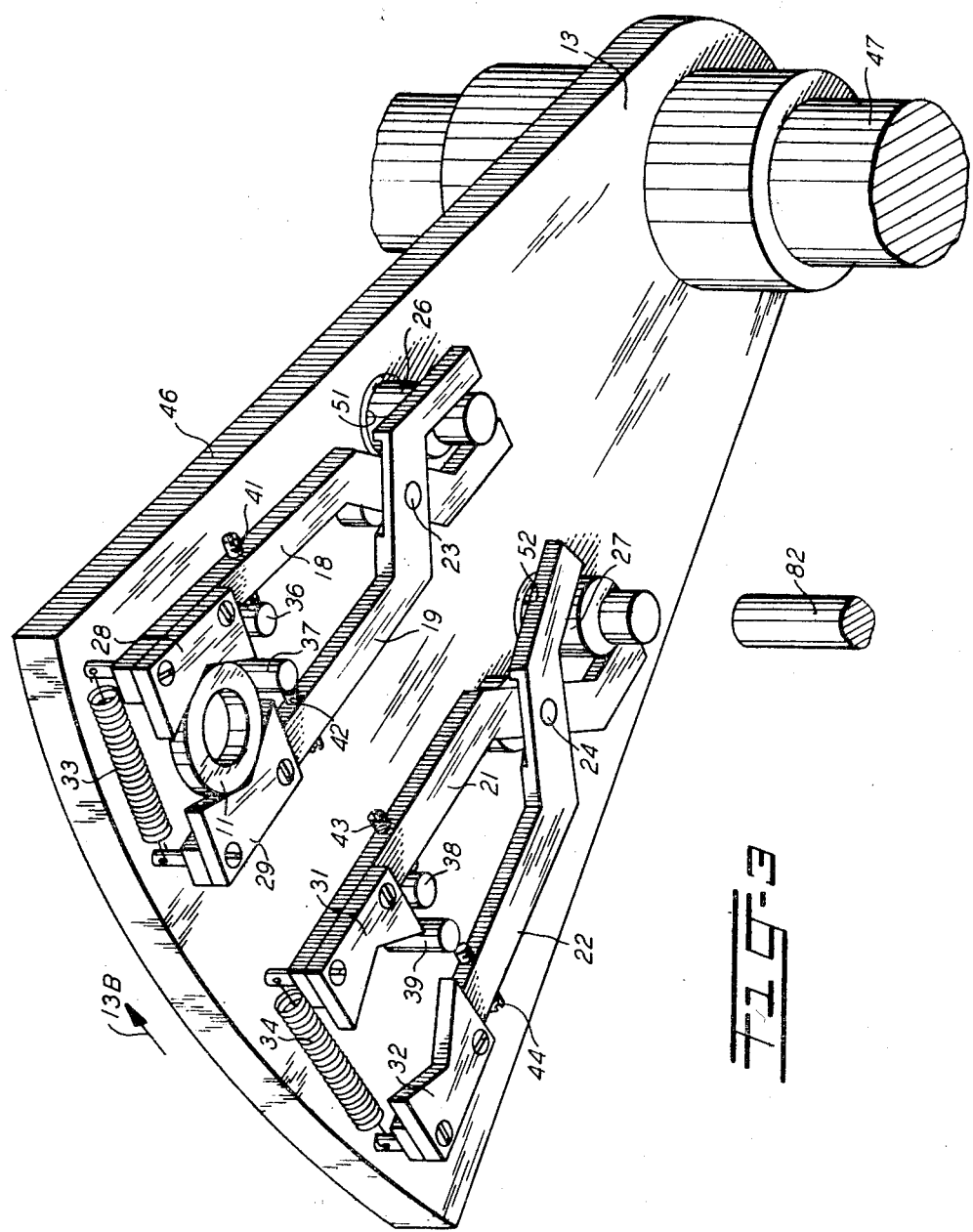

METHOD OF AND APPARATUS FOR MEASURING A TIME VARYING CHARACTERISTIC OF A MAGNETIC CORE

BACKGROUND OF THE INVENTION

This invention relates to methods and apparatus for testing one or more articles and, more particularly, to methods and apparatus for measuring a time-varying characteristic of an article at two distinct instants in time.

Certain articles, such as ferrite cores, exhibit the property that a quantitatively measurable characteristic of an article does not attain a fixed value immediately after production of the article. Instead, the characteristic will vary with time, approaching a final value, e.g., asymptotically.

In the particular case of ferrite cores, the articles may be formed from powdered metal, e.g., manganese-zinc or nickel-zinc ferric oxide, by a series of powder compacting, sintering and surface finishing operations. Due both to nonuniformity in batches of the powder forming the base material of these articles and to variations in such production conditions as pressures and temperatures, the nature of the permeability of different finished cores may differ appreciably. Moreover, it has been observed that the characteristic, permeability, is ordinarily of a time-varying nature, asymptotically approaching a final value of zero.

Utilizing appropriate test equipment, the permeability of a ferrite core, $\mu$, may be determined from the equation:

$$\mu = \frac{l(L - L_{ref})}{KN^2 A}$$

where:

$L$ is the inductance of a test coil employing the core,
$L_{ref}$ is the inductance of the test coil without the core,
$l$ is the effective length of the magnetic path,
$K$ is a constant of known value, depending upon the units used,
$N$ is the number of turns in the test coil, and
$A$ is the effective cross-sectional area of the magnetic path.

The change in the permeability of a core with time, identified as the disaccomodation factor, DAF, provides a useful criterion for establishing a useful, time-dependent permeability characteristic value for a ferrite core. The disaccomodation factor may be determined from the equation:

$$DAF = \frac{L_2 - L_1}{L_1 \mu_1 \log (t_2/t_1)}$$

where:

$t_1$ and $t_2$ are elapsed times after demagnetizing of the core,
$L_1$ and $L_2$ are inductances of the test coil employing the core at times $t_1$ and $t_2$, respectively, and
$\mu 1$ is the permeability at time $t_1$.

In order to calculate the disaccomodation factor, it is clear that the time-varying characteristic, permeability, must be determined for a ferrite core at two distinct instants in time, namely the times $t_1$ and $t_2$. In order to obtain accurate data, it is preferable that the times $t_1$ and $t_2$ be separated by a substantial lapse. Typically, $t_1$ and $t_2$ may be picked as 3 minutes and 30 minutes, respectively, after a time of demagnetizing $t_0$, providing a 27 minute gap between the times $t_1$ and $t_2$.

Obviously, it would be quite wasteful to maintain a ferrite core in a permeability testing station for a long period of time between first and second permeability tests, e.g., 27 minutes, tying up the appropriate test equipment for this time. The provision of new and improved methods and apparatus for testing a time-varying characteristic of an article, such as the permeability of a recently formed ferrite core, at two distinct points in time, without a necessity for the core to remain in a fixed testing position for an extended period of time, would, thus, be of obvious usefulness.

SUMMARY OF THE INVENTION

An object of the invention resides in new and improved methods and apparatus for testing one or more articles, e.g., so as to determine the value of a time-varying characteristic of an article at two distinct instants of time.

The invention contemplates methods and apparatus whereby an article may be tested at first and second times $t_1$ and $t_2$, respectively, without it being necessary that the article remain stationary in a single testing station for an appreciable portion of the time lapse $t_1$ to $t_2$. Thus, other articles may be tested by the apparatus between the times $t_1$ and $t_2$.

The invention further contemplates providing added economy in usage of time and testing facilities through the utilization of plural article testing stations for performing one test upon the article at the times $t_1$ and $t_2$ and another test upon the article at a time $t_i$ intermediate the times $t_1$ and $t_2$. The first test may be performed in a first testing station at the times $t_1$ and $t_2$ with the article being conveyed about a closed loop to pass through a second testing station at the time $t_i$ for performance of the other, intermediate test. A succession of articles may be processed through apparatus of this type, only certain of the articles being tested at any one point in time.

The articles to be tested may be ferrite cores, with a time-varying permeability characteristic of each core measured in a permeability testing station at predetermined times $t_1$ and $t_2$ for each core, depending upon a demagnetization time $t_0$ for the particular core. A series of conveyors transports each core from a demagnetizing station to a loading station, thence the permeability testing station, next to an intermediate miscellaneous testing station, thereafter back to the permeability testing station and, finally, to an unloading station. The conveyors are operated at timed relationship such that a core may be demagnetized at a time $t_0$ for the core, establishing times $t_1$, $t_i$ and $t_2$ for the core at predetermined time intervals after time $t_0$, and may then be tested in the permeability testing station at $t_1$, in the miscellaneous testing station at $t_i$ and again in the permeability testing station at $t_2$.

BRIEF DESCRIPTION OF THE DRAWING

FIG. 1 is a plan view, with parts broken away along the line 1—1 of FIG. 2, of portions of apparatus constructed in accordance with the principles of the invention for carrying out a method of testing articles, such as ferrite cores, the apparatus including a pair of article testing stations and several rotary conveyors for transporting the articles, to, between and from the two test stations;

FIG. 2 is a vertical side view of the apparatus of FIG. 1, depicting plural, parallel lines of rotary conveyors and showing facilities for driving the various rotary conveyors in timed relationship in accordance with the principles of the invention; and FIG. 3 is an isometric view of a typical rotary conveyor, viewed generally upwardly from beneath the conveyor, illustrating a pair of article gripping mechanisms associated with the conveyor.

DETAILED DESCRIPTION

Referring to the drawing, certain tests are to be performed upon a succession of articles such as a ferrite core 11 best depicted in FIG. 3. An adapter assembly may, alternatively, be used to house each successive core. Each ferrite core will first be demagnetized by conventional apparatus at a demagnetizing station D at a time $t_0$ for the particular core. Each successive core will, of course, have a different characteristic time of demagnetizing $t_0$. At a first predetermined time $t_1$ for each ferrite core, terminating a predetermined first time lapse subsequent to the demagnetizing time $t_0$ associated with the particular core, a first permeability test is to be performed upon the core. At a second predetermined time $t_2$ for each ferrite core, terminating a predetermined second time lapse subsequent to the demagnetizing time $t_0$ associated with the particular core, a second permeability test is to be performed upon the core. The times $t_1$ and $t_2$ are typically 3 minutes and 30 minutes, respectively, after the time $t_0$ for each core. All permeability tests will be performed upon successive cores, at the appropriate times for each core, in a permeability testing station P. As shown in FIG. 2, identical demagnetizing and permeability testing stations are preferably arrayed in plural sets for operating plural ferrite core testing lines in parallel. For convenience of description, however, only one testing line will be described in detail, e.g., the top line in FIG. 2.

A useful time-dependent permeability characteristic value may be extrapolated for each core through the use of the instantaneous permeability values obtained by the two testing operations performed upon the core in the permeability station P at the two distinct instants $t_1$ and $t_2$. Although not forming part of the present invention, it is contemplated to use electronic data processing equipment to initiate the permeability test of each core and to receive and process the information obtained from these tests so as to assign a useful permeability characteristic value to each core. Such electronic data processing equipment may further be utilized to control a ferrite core production operation so as to produce finished cores having permeability characteristic values falling within a desired range of values.

A linear conveyor or transfer mechanism 12 (FIGS. 1 and 2), such as a conventional constant speed conveyor belt, and a rotary conveyor or transfer mechanism 13 are included in the apparatus. These mechanisms will function in cooperation so as to locate each successive ferrite core 11 in the permeability testing station P at the specific instant $t_1$ selected for initial permeability testing of the core. The linear conveyor 12 will first transfer a demagnetized core to a loading station L from the demagnetizing station D. Thereafter, the rotary conveyor 13 will transport the core into the permeability testing station P at the time $t_1$.

Three additional rotary conveyors or transfer mechanisms 14, 15 and 16 are provided. These rotary conveyors will function to transport successively tested ferrite cores about a closed path, after the performance of an initial permeability test upon each core in the permeability testing station P, in such manner as to return the core to the station P at the correct time $t_2$ for a second permeability test to be performed upon the core. Between test on a particular core member, a succession of other cores may be advanced into, tested at, and conveyed away from the permeability testing station.

Additionally, an intermediate, miscellaneous station M is positioned along the closed path of core travel, as shown adjacent to the rotary conveyor 16. Thus, one or more additional tests, e.g., the obtaining of resistance and/or other measurements, may be performed upon each core at a predetermined intermediate time $t_i$ between the two permeability tests upon the core. Typically, the time $t_i$ will be 16 ½ minutes after the time $t_0$ for a particular core, i.e., midway between the times $t_1$ and $t_2$ for the core. Of course, more than one intermediate testing station might, alternatively, be utilized in a testing system of this type.

The rotary conveyors 13, 14 and 16 are identical. The rotary conveyor 15, however, is quite different from the three other rotary conveyors. The rotary conveyor 15 is simply a passive, relatively large diameter rotary table with includes adjacent to its outer periphery a large number of nests 17 for receiving ferrite cores. The rotary conveyors 13, 14 and 16, on the other hand, are somewhat more complex devices, as best depicted in FIG. 3, in illustration of the rotary conveyor 13.

Each rotary conveyor 13, 14 or 16 includes two pairs of article gripping fingers 18 and 19, 21 and 22. The fingers of each pair are mounted to pivot about a pin 23 or 24, toward or away from each other in scissorslike fashion, under the control of a camming member 26 or 27. The camming members 26 and 27 are positioned across the pivot pins 23 and 24, respectively, from notched gripping plates 28 and 29 or 31 and 32 mounted one on each gripping finger. Springs 33 and 34, disposed adjacent to the notched gripping plates, urge the gripping fingers of each pair toward one another.

Relative upward displacement of a pair of gripping fingers 18 and 19 or 21 and 22 with respect to the associated camming member 26 or 27 will pivot the gripping fingers apart, separating the gripping plates 28 and 29 or 31 and 32 into an "open" condition against the bias of the spring 33 or 34. Such separating movement will occur as follower surfaces on the gripping fingers are cammed apart by a tapered camming surface positioned between a relatively large diameter upper portion of the camming member and a relatively small diameter lower portion of the camming member. The pair of gripping fingers is then maintained in an "open" condition by the relatively large diameter upper portion of the camming member. In the "open" condition of the pair of gripping fingers, a ferrite core may be located in a "pickup" position between, or dropped from between, the notched gripping plates of the gripping fingers. In a "closed" condition of the pair of gripping fingers, provided by action of the associated spring 33 or 34 upon a subsequent relative upward displacement of the pair of gripping fingers with respect to the associated camming member, a core 11 located in the "pickup" position will be gripped between the notched portions on the facing gripping plates by a moderate gripping force. Posts 36 and 37, 38 and 39 are also associated with the gripping fingers 18 and 19, 21 and 22, respectively, forming stops for limiting inward movement of the gripping fingers through contact with adjustable studs 41 and 42 or 43 and 44. The stops function in cooperation with the adjustable studs both to limit the compressive force on a gripped core 11 and to maintain at least some contact pressure between the gripping fingers and the associated camming members 26 or 27 at all times. The stops also provide a means of adjusting the angular relationships of the gripping plates 28, 29, 31 and 32 into correct attitudes for picking up appropriately positioned cores.

The pivot pins 23 and 24, supporting the associated gripping finger pairs, are mounted at the bottom of a rotary plate 46 for rotary and vertical movement with the rotary plate. The rotary plate 46 of rotary conveyor 13 is fixed to a vertical shaft 47. Similarly, the rotary plates 46 of rotary conveyors 14 and 16 are fixed to vertical shafts 48 and 49, respectively. Intermittent rotary movements of the vertical shafts 47, 48 and 49 will impart required rotary movements to the various rotary plates 46 and, thus, to the gripping finger pairs. Vertical movements of the vertical shafts 47, 48 and 49 will impart vertical movements to the gripping finger pairs and will aid in affording limited relative vertical movements between each gripping finger pair 18 and 19 or 21 and 22 and the associated camming member 26 or 27.

A pair of camming members housing apertures 51 and 52 pass vertically through each rotary plate 46. Each aperture has a diameter slightly greater than the relatively large diameter of the upper portion of each camming member 26 or 27. The camming members are disposed one extending through each aperture 51 or 52. This arrangement permits a limited degree of relative vertical displacement between the rotary plate 46, mounting the pairs of gripping fingers 18 and 19, 21 and 22, and the associated camming members 26, 27, respectively. Meanwhile, as previously set forth, each camming member is continuously held between the follower surfaces of the associated gripping fingers by at least a moderate degree of contact pressure in all relative vertical positions of the camming member. Thus, the camming member will at no time slip downwardly between the gripping finger follower surfaces under the influence of gravity forces.

It is intended that all vertical movements of the rotary conveyors 13, 14 and 16 will occur in angular positions of the respective rotary plates 46 corresponding to required core member "pickup" and "release" locations. Additionally, all relative vertical displacements which are to take place between the pairs of gripping fingers and the associated camming members, provided for purposes of opening or closing the gripping fingers, will occur in these angular positions.

Vertical movements are to be imparted to the shafts 47, 48 and 49 in the required angular positions of each shaft by movements of rocker arms 53, 54 and 56 (FIG. 2), respectively, which engage collars 57, 58 and 59 on the intermittently rotated shafts. Cams 61, 62 and 63 will operate the rocker arms 53, 54 and 56, respectively, when rotated through a drive train 64, which includes a motor 66 and a clutch 67. Pins 68, 69 and 71 on the shafts 47, 48 and 49, respectively, will permit downward movement of the shafts only when correctly aligned angularly with slots 72, 73 and 74, in fixed housing 76, 77 and 78, respectively. These slots are, of course, in the desired angular positions for vertical movements of the shafts 47, 48 and 49.

Fixed upper and lower rods 81 and 82, respectively, are suitably located so as to abut axially, and thereby arrest continued vertical movement of, each appropriate camming member 26 or 27 after an initial vertical displacement of the rotary plate 46 which supports such camming member. Continued vertical movement of the rotary plate 46 will thereupon provide required relative repositioning of the camming member with respect to the associated gripping fingers 18 and 19 or 21 and 22.

Intermittent rotary motion is to be afforded to the shafts 47, 48 and 49 which carry the rotary conveyors 13, 14 and 16, respectively, and to a rotary column 83 (FIG. 2) to which the rotary conveyor 15 is fixed, by means of the drive train 64. A main drive shaft 84, forming part of the drive train 64, is rotatable by the motor 66 when the clutch 67 is engaged. The main drive shaft is connected through various belts and pulleys to rotate the shafts 47, 48 and 49, and the column 83, through conventional indexing assemblies 86, 87, 88 and 89, which will also operate the cams 61, 62 and 63. Vertical movements of the shafts 47, 48 and 49 are permitted by splined couplings (not shown) located beneath the collars 57, 58 and 59.

Incremental movements of the indexing assemblies 86, 87, 88 and 89, so as to impart intermittent rotary movement to the shafts 47, 48 and 49, to the column 83 and to the cams 61, 62 and 63, are to be provided by operation of a conventional control circuit (not shown). Rotation of the rotary conveyors 13, 14, 15 and 16 is to occur in the direction of arrows 13A, 14A, 15A and 16A, respectively, in FIG. 1. The rotary conveyor 13 will be rotated in the direction of arrow 13B in FIG. 3. Thus, the pair of gripping fingers 18 and 19 may be considered a leading pair, and the pair of gripping fingers 21 and 22 will constitute a trailing pair.

In discussing the operation of the depicted article testing apparatus for testing ferrite cores in accordance with the principles of the invention, it is assumed, initially, that a ferrite core 11 is located at the demagnetizing station D and has just been demagnetized. This particular ferrite core will hereafter be designated as the reference core 11. An initial time, $t_0$, is defined at the completion of the demagnetizing operation. It is required that the demagnetized reference core 11 be located in the permeability testing station P at a predetermined time $t_1$, e.g., 3 minutes after the time $t_0$, as an initial permeability test is to be performed upon the demagnetized reference core at the time $t_1$ in the station P.

The reference core 11 is advanced to the loading station L by the linear conveyor 12. Clearly, the reference core must arrive at station L at a time sufficiently prior to the time $t_1$ such that a subsequent transfer of the core to the permeability testing station P by the rotary conveyor 13 may position the core member in station P at the time $t_1$.

The rotary conveyor 13 is now assumed to be disposed with its trailing pair of gripping fingers 21 and 22 positioned above the reference core 11 at the loading station L. These fingers are in the "open" position, as depicted in FIG. 3. Upon the arrival of the reference core at station L, the cam 61 and the slotted housing 76 cooperate to provide a downward movement to the shaft 47 and the rotary conveyor 13. The rotary conveyor 13 continues its descent as the camming member 27 comes into contact with, and is vertically restrained from further downward movement by, a top surface of an upwardly projecting fixed rod 82. Thus, as the notched gripping plates 31 and 32 descend into a "pickup" position on either side of the reference core 11, the follower surfaces of the gripping fingers 21 and 22 are displaced downwardly with respect to the surfaces of the stationary camming member 27. As a result, the spring 34 causes the gripping fingers to close about the reference core and firmly grip the core between gripping plates 31 and 32.

With the reference core 11 so gripped between the trailing fingers 21 and 22 of the rotary conveyor 13, the indexing assembly 87 (FIG. 2) operates to advance the rotary conveyor 13 in the direction of the arrow 13A (FIG. 1). Thus, the reference core is conveyed toward the permeability testing station P. A tested ferrite core is simultaneously being advanced toward the rotary conveyor 15 by the rotary conveyor 14.

The advance of the reference core 11 between the stations D and P, first by means of the linear conveyor 12 and then by means of the rotary conveyor 13, occurs in such manner that the reference core is positioned in the permeability testing station P at the predetermined time $t_1$ for an initial permeability test upon the reference core. The pattern or movement of the reference core between the stations D and P is not critical during any particular segment of the time period $t_0$ and $t_1$. Nor, indeed, is the exact path of movement ordinarily critical, since alternative paths might be utilized in modified apparatus in accordance with the principles of the invention. The only critical criterion is that the demagnetized reference core 11 be positioned in the permeability testing station P at the predetermined time $t_1$, with its normal aging curve not affected by any rapid acceleration or deceleration, in order that the initial permeability test may occur at time $t_1$. The reference core must, thus, be moved at a predetermined overall average speed for a path of given length between the stations D and P. Discontinuous movement, including any desired pattern of dwell periods at either of these two stations or intermediate the two stations between the times $t_0$ and $t_1$, will fit the required program of movement.

The time period $t_0$ to $t_1$, in fact, includes several additional operations associated with the rotary conveyor 13. Thus, the leading pair of gripping fingers 18 and 19 is operated, during a programmed dwell of the fingers 18 and 19 at the permeability testing station P prior to the arrival at station P of the trailing pair of gripping fingers 21 and 22, to pick up, for a subsequent unloading operation, a ferrite core which has already undergone a completed testing cycle. The trailing pair of gripping fingers 21 and 22 is then indexed into the station P, whereupon, in a reversal of the "pickup" operation previously described, the shaft 47 is raised. Thus, the camming member 27 is stopped by contacting a bottom surface of a downwardly projecting fixed rod 81 after an initial upward movement of the camming member, and the reference core 11 drops from between the upwardly moving, trailing pair of gripping fingers 21 and 22 into a testing position provided by permeability testing equipment 91 at the permeability testing station P. Thereafter, still prior to the time $t_1$, the rotary conveyor 13 is further rotated through an arc sufficient to clear the testing equipment 91 at station P. The first permeability test may then be performed upon the reference core.

As outlined previously, after the completion of the first permeability test upon the demagnetized reference core 11 at the permeability testing station P, it will be necessary that the reference core be positioned in station P once again at the predetermined time $t_2$ for a second permeability test to be performed upon the reference core. Moreover, an additional miscellaneous test operation e.g., the performance of a resistance measuring test upon the reference core, is to occur at the miscellaneous testing station M during a dwell period commencing at a predetermined time, $t_i$, intermediate the times $t_1$ and $t_2$. An exemplary pattern of movement, provided by cooperative action of the rotary conveyors 14, 15 and 16, utilizes respective values for $t_i$ and $t_2$ of 16½ minutes after $t_0$ and 30 minutes after $t_0$ respectively.

During the period between $t_1$ and $t_i$, several operations of the rotary conveyors 14, 15 and 16 take place. Thus, the trailing pair of gripping fingers 21 and 22 of the rotary conveyor 14 is operated to pick up the tested reference core 11 at the permeability testing station P in the manner previously described with respect to the rotary conveyor 13. Rotation of the rotary conveyor 14 then positions the trailing pair of gripping fingers over an open receiving nest 17 in the tablelike rotary conveyor 15. Next, the trailing pair of gripping fingers of the rotary conveyor 14 is operated, in the manner previously described with respect to the rotary conveyor 13, to drop the reference core into the aligned nest 17 of the rotary conveyor 15. Thereafter, the reference core is indexed, by rotation of the rotary conveyor 15 in the direction of the arrow 15A at a relatively slow rate of advance in comparison to the movement provided by the rotary conveyors 13 and 14, until the reference core attains a "pickup" position adjacent to the path of the rotary conveyor 16. Finally, "pickup," rotation and release movements of the rotary conveyor 16, similar to those previously described with respect to the rotary conveyors 13 and 14, act to position the reference core 11 in the miscellaneous testing station M. During this operation of the rotary conveyor 16, the leading pair of gripping fingers 18 and 19 picks up a previously tested core from the miscellaneous testing station M. The "pickup" operation is performed during a dwell in the rotation of the rotary conveyor 16, preceding the positioning of the trailing pair of gripping fingers 21 and 22 at the station M and the release of the reference core into this station. Still prior to the arrival of the time $t_i$, the rotary conveyor 16 is further rotated to clear a testing zone associated with miscellaneous testing equipment 92 located at the miscellaneous testing station M. The required test or tests then occur upon the reference core 11 at the time $t_i$.

During the advance of the reference core 11 from the permeability testing station P to the miscellaneous testing station M, numerous other cores are being successively advanced both from the demagnetizing station D toward the permeability testing station P and from the station P toward the miscellaneous testing station M. During each 360° rotary cycle of the rotary conveyors 13, 14 and 16, e.g., once every approximately 30 seconds, an initial permeability test and a miscellaneous test program will be performed simultaneously on two cores, one in each of the stations P and M. Cores not undergoing testing during any such cycle will be found both on the linear conveyor 12 and, normally in larger number, on the relatively larger diameter rotary conveyor 15.

Turning again to the reference core 11, the return of this core to the permeability testing station P at $t_2$ from the miscellaneous testing station M at $t_i$ will be accomplished by continued rotary operation of the three rotary conveyors 14, 15 and 16. The time $t_i$ has preferably been selected at the midpoint between the time $t_1$ and $t_2$. The advance of the reference core 11 into the miscellaneous testing station M at the time $t_i$ has occurred through half-rotational movements of the rotary conveyors 14, 15 and 16, in the directions of the respective arrows 14A, 15A, and 16A, in succession. Similar rotational movements of the rotary conveyors 14, 15 and 16 through second, return arcs of substantially 180° occurring during subsequent cycles of rotation of the relatively small diameter rotary conveyors 14 and 16, will now effect the return of the reference core to the permeability testing station P at time $t_2$. The advance and return paths thereby defined for travel of the reference core are of equal length. The same rotary conveyors provide transportation, through the same arcs and at the same rate of rotary displacement, to the reference core during the advance and return movements. Thus, the overall time lapse occurring during the advance stage from station P to station M is equal to that occurring during the equidistant return stage form station M to station P. This provides a simple pattern of movement in accordance with the selected pattern of testing wherein $t_i$ is the time of performance of an intermediate miscellaneous test at the miscellaneous testing station M occurring midway in time between the performances of permeability tests at the permeability testing station P at times $t_1$ and $t_2$.

The leading pair of gripping fingers 18 and 19 of the rotary conveyor 14, the tablelike rotary conveyor 15, and the leading pair of gripping fingers 18 and 19 of the rotary conveyor 16 now operate sequentially upon the reference core 11 to transport the reference core along the return path between the miscellaneous testing station M and the permeability testing station P. The manner of operation of these rotary conveyors during this return phase will not be discussed in detail, as it is identical to the operation of the same rotary conveyors during the advance phase. It is sufficient to state that the reference core 11 is returned to the permeability testing station P by a sequence of 180° rotations of the rotary conveyors 16, 15 and 14, whereupon a second permeability test is performed at the time $t_2$ upon the reference core.

A final movement of the reference core 11 is effected by the rotary conveyor 13 subsequent to time $t_2$. This final movement simply involves a transfer of the reference core from the permeability testing station P to suitable unloading equipment 93, e.g., a continuously operated linear conveyor, in an appropriately positioned unloading station U. The leading pair of gripping fingers 18 and 19 of the rotary conveyor 13 are utilized for this unloading operation, picking up the tested reference core 11 from station P prior to the emplacement of another ferrite core in station P by the trailing pair of gripping fingers 21 and 22 of the rotary conveyor 13. A final substantially 180° arc of rotation of the rotary conveyor 13 includes a dwell period for release of the reference core at the unloading station U. The location of the station U and the time of unloading are not critical, unless additional testing equipment is to be provided to perform additional testing upon the reference core 11 at some critical instant of time subsequent to the time $t_2$.

During the performance of the demagnetizing, advancing, testing, returning and unloading operations upon the reference core 11, the apparatus is also performing a similar series of operation upon a number of other ferrite cores sequentially processed through the testing apparatus. It may be noted that two permeability testing operations are performed upon each ferrite core at times $t_1$ and $t_2$ running from the demagnetizing of that particular core, and that one miscellaneous testing operation is performed at an intermediate time $t_i$, which time also is characteristic of that particular core, running from the time of demagnetizing of the core. It may further be noted that during each 360° rotational cycle of the rotary conveyors 13, 14 and 16, e.g., once every approximately 30 seconds, a first permeability test and a miscellaneous test are substantially simultaneously performed upon two different cores and then, still during the same 360° rotational cycle, a third core is subjected to a second permeability test. The performance of the two "pickup" operations by the leading pairs of gripping fingers 18 and 19 of the rotary conveyors 13 and 14 prior to the performance of the two release operations of the respective trailing pairs of gripping fingers 21 and 22 permits the performance of two permeability tests at the permeability testing station P during each 360° cycle of the rotary conveyors 13 and 14. Such tests will occur at approximately 180° intervals in the coordinated 360° rotary cycles of these two rotary conveyors.

It may be noted that 3 minutes and 30 minutes after demagnetizing have been suggested for the times $t_1$ and $t_2$, respectively. Reviewing the equation for the disaccommodation factor DAF previously set forth in the Background of the Invention section, it should be observed that the denominator includes the term log $(t_2/t_1)$. For the suggested values of $t_1$ and $t_2$, the term $t_2/t_1$ is equal to 10 and the term log $(t_2/t_1)$, thus, reduces to unity. Therefore, determination of the disaccommodation factor is simplified by the use of the suggested values of $t_1$ and $t_2$, while a 27 minute interval between these suggested times provides accurate results. The testing equipment 91, located at the permeability testing station P, includes apparatus for measuring the unknown inductance values $L_1$ and $L_2$, at the times $t_1$ and $t_2$, required to satisfy the permeability and disaccommodation factor equations set forth in the Background of the Invention section.

It is to be understood that the described apparatus and method are simply illustrative of one embodiment of the invention. In other embodiments, either fewer or more than one miscellaneous testing station, not constituting permeability testing stations, may be employed, and/or more than two permeability tests may take place in the testing of ferrite cores or similar articles. Moreover, in still other embodiments, any given time-varying characteristic of any type of article may be measured in similar manner at two distinct instants in time, either at the same or at different testing stations. Any desired path and pattern of motion may be utilized in such embodiments, it being necessary only that programmed movements of an article position the article in each testing station at predetermined testing times. Many additional modifications of the illustrative apparatus and method may be made in accordance with the principles of the invention.

What is claimed is:

1. A method obtaining data concerning the permeability of a ferrite core comprising the steps of;

demagnetizing the ferrite core at a predetermined time prior to a first testing time;

measuring the value of the permeability of the ferrite core at the first testing time in a first location;

moving the ferrite core to a second location in a manner selected to position the ferrite core in said second location at a second testing time; and measuring the value of the permeability of the ferrite core at said second testing time in said second location so that said first and second testing times provide times of permeability measurement at two known intervals after completion of said demagnetizing operation.

2. A method of obtaining data concerning the properties of a magnetic core through the use of conveyor means and core testing means, which method comprises the steps of:

conveying the core toward core testing means located in a first test position at a first average rate of speed selected such that the core will occupy said first test position at a first testing time; and performing a first test upon the core in said first test position at said first testing time to measure the value of a first characteristic of the core at said first testing time; thereupon conveying the core toward core testing means located in a second test position at a second average rate of speed wherein said second average rate of speed is different from said first average rate of speed and said second average rate of speed is selected such that the core will occupy said second test position at a second testing time after said first testing time; and performing a second test upon the core in said second test position at said second testing time to measure the value of said first characteristic at the said second testing time.

3. A method of obtaining data, as set forth in claim 2, wherein intermediate said first and said second tests, the core is conveyed to a third test position so that the core will occupy said third test position at a third testing time, intermediate said first and said second testing time, and performing a third test upon the core in said third test position at said third testing time to measure the value of a second characteristic of the core at said third testing time.

4. In a method of obtaining data, as set forth in claim 3 wherein said first test position and said second test position are the same, and wherein the core is conveyed back to said first test position at said second testing time via said intermediate third test position.

5. Apparatus for monitoring magnetic characteristics of a magnetic core, the apparatus comprising:

means movable between a core loading station and a first testing station at a first selected average rate of speed for advancing the core into the said first testing station at a first testing time;

means movable between said first testing station and a second testing station at a second selected average rate of speed for advancing the core into said second testing station at a second testing time wherein said second selected average rate of speed is different from said first selected average rate of speed; and magnetic characteristic testing means located in said first and second testing stations and rendered effective at said first and second testing time, respectively, for measuring a magnetic characteristic of the core at said first and said second testing time.

6. In apparatus for testing a ferrite core:

first core carrying means movable between a demagnetizing station and a permeability testing station for advancing the core toward the permeability testing station;

means located at the permeability testing station and rendered effective at a first testing time and thereafter at a second testing time for measuring the permeability of the core;

second core carrying means movable between the permeability testing station and a second testing station for transferring the core from the permeability testing station to the second testing station and thereafter returning the core from the second testing station to the permeability testing station;

means located at the second testing station and rendered effective at an additional testing time intermediate said first and second predetermined times for measuring another characteristic of the core; and drive means, moving the first and second core carrying means at predetermined, coordinated rates of speed, for positioning the core in the permeability testing station at said first and second testing times and positioning the core in the second testing station at said additional testing time.

7. In ferrite core testing apparatus as set forth in claim 6:

said second core carrying means including a rotary member rotatable by said drive means, effective upon rotation through a first arc of approximately 180° to convey the core toward the second testing station and effective upon rotation through a second arc of approximately 108° located substantially diametrically opposite to said first arc to convey the core back toward the permeability testing station.

8. In ferrite core testing apparatus as set forth in claim 7:

said first core carrying means including a rotary member rotated by the drive means through a first arc to advance the core between the demagnetizing station and the permeability testing station; and said drive means including means for rotating the rotary member through a second arc to carry the core to an unloading station from the permeability testing station after said second testing time.

9. A method of obtaining data concerning the permeability of a ferrite core through the use of conveyor means and permeability testing means, comprising the steps of:

demagnetizing the ferrite core at a predetermined time prior to a first testing time;

conveying the ferrite core toward the permeability testing means located in a first test position at a first average rate of speed selected such that the ferrite core will occupy the first test position at the first testing time; and performing a first test upon the ferrite core to measure the permeability in the first test position at said first testing time; thereupon conveying the ferrite core toward the permeability testing means located in a second test position at a second average rate of speed selected such that the ferrite core will occupy the second test position at a second testing time after said first testing time; and performing a second test upon the ferrite core to measure the permeability in the second test position at the second testing time so that the first and second testing times provide times of permeability measurement at two known intervals after completion of said demagnetizing operation.